United States Patent [19]

Hill

[11] 4,015,994

[45] Apr. 5, 1977

[54] COATED GLASS FIBERS

[75] Inventor: Homer G. Hill, Newark, Ohio

[73] Assignee: Owens-Corning Fiberglas Corporation, Toledo, Ohio

[22] Filed: Oct. 14, 1975

[21] Appl. No.: 622,186

Related U.S. Application Data

[60] Continuation-in-part of Ser. No. 523,306, Nov. 13, 1974, abandoned, which is a division of Ser. No. 442,529, Feb. 14, 1974, abandoned.

[52] U.S. Cl. .................................. 106/99; 106/120
[51] Int. Cl.² ................................. C04B 7/02
[58] Field of Search ..................... 106/99, 120

[56] References Cited

UNITED STATES PATENTS

| 2,738,285 | 3/1956 | Biefeld et al. | 106/99 |
| 2,793,130 | 5/1957 | Shannon et al. | 106/99 |
| 3,472,668 | 10/1969 | Pfeifer et al. | 106/120 |
| 3,650,785 | 3/1972 | Ball et al. | 106/99 |

*Primary Examiner*—J. Poer
*Attorney, Agent, or Firm*—John W. Overman; Patrick P. Pacella

[57] ABSTRACT

Vinyl ester resin coated glass fibers are disclosed. The coated glass fibers are especially suited for reinforcing cementitious materials.

9 Claims, No Drawings

COATED GLASS FIBERS

This is a continuation-in-part of application Ser. No. 523,306 filed Nov. 13, 1974, which is a division of application Ser. No. 442,529, filed Feb. 14, 1974, both now abandoned.

This invention relates to coated glass fibers. More particularly, this invention relates to coated glass fibers suitable for reinforcing cement and concrete.

Until quite recently it has not been advisable to use glass fibers for long term (5 or more years) reinforcement of hydrous calcium silicate crystals, cement, concrete, mortar, or other cementitious materials or matrices that have a high alkali content. The harsh alkali environment would degrade the types of glass fibers, E glass for example, commonly used to reinforce non-alkali materials such as plastics.

E glass fibers are not generally recommended for the long term reinforcement of Portland cement or other cementitious products. The alkali content of the cementitious matrix attacks the E glass fiber surface and substantially weakens the fibers. This alkali attack and subsequent fiber strength loss generally so weakens the fibers that long term reinforcement of the matrix by the E glass fibers is neither predictable nor dependable.

To remedy this situation the prior art has tried a number of potential solutions. One is to coat the fibers with some material that is alkali resistant. Epoxy resin coated fibers, for example, generally will withstand alkali attack. Another potential solution is to use a high alumina cement which has less alkali content. Still another solution is to formulate a glass composition which in fiber form will be resistant to alkali attack.

I have now discovered that glass fibers coated with vinyl ester resins are especially suited for reinforcing cementitious materials.

Accordingly, an object of this invention is to provide glass fibers coated with vinyl ester resins.

Another object of this invention is to provide cementitious materials reinforced with vinyl ester resin coated glass fibers.

Other objects, aspects, and advantages of this invention will be apparent to one skilled in the art from the following disclosure and appended claims.

Any commercially available glass fibers, such as those produced from E glass, can be used in the practice of this invention. It is preferred to use alkali-resistant glass fibers, especially calcium hydroxide resistant glass fibers, with the concepts of this invention.

Alkali-resistant glass fibers that can be employed include those disclosed in British Patent Specification Nos. 1,243,972 and 1,290,528 and in U.S. patent application Ser. No. 275,613 filed on July 27, 1972. The $ZrO_2$ and $TiO_2$ containing compositions described in application Ser. No. 275,613 provide a unique combination of alkali resistance, low liquidus temperature, and desirable viscosity for the fiberization of glass compositions and for the reinforcement of cementitious materials. The glass compositions of application Ser. No. 275,613 have the following range of proportions by weight: $SiO_2$, 60 to 62%; CaO, 4 to 6%; $Na_2O$, 14 to 15%; $K_2O$, 2 to 3%; $ZrO_2$, 10 to 11%; and $TiO_2$, 5.5 to 8%.

E glass is a textile glass composition used for many years for the reinforcement of non-alkali matrices such as plastics. It is well known for its properties which allow it to be easily and economically fiberized in commercial quantities and at commercial rates using direct melt furnaces and fiberizing techniques. E glass has the following composition in percent by weight:

| Ingredient | E glass |
| --- | --- |
| $SiO_2$ | 54.6 |
| $Al_2O_3$ | 14.5 |
| CaO | 18.0 |
| MgO | 4.0 |
| $B_2O_3$ | 6.9 |
| $Na_2O$ | 0.4 |
| $TiO_2$ | 0.6 |
| $F_2$ | 0.6 |
| $Fe_2O_3$ | 0.4 |

The coated glass fibers of this invention can be successfully used as a reinforcing material in various cementitious products or matrices including cement, Portland cement, concrete, mortar, gypsum, and hydrous calcium silicate.

The term hydrous calcium silcate denotes crystalline compounds formed by the reaction of lime (CaO), silica ($SiO_2$), and water. Two hydrous calcium silicates generally of interest are: tobermorite, having a formula 4 CaO · 5 $SiO_2$ · 5 $H_2O$; and zonotlite, having the formula 5 CaO · 5 $SiO_2$ · $H_2O$. Hydrous calcium silicate products often are used as heat insulation materials.

The coated glass fibers of this invention can be used alone or in combination with asbestos fibers, mineral wool, or organic fibers such as wood fibers in the production of cementitious products, especially calcium silicate products.

The organic materials are cellulosic type materials such as pulp fiber, cotton, straw, bagasse, wood flour, hemp, rayon coir fiber, and the like.

The vinyl ester resins employed in this invention are represented by the formula:

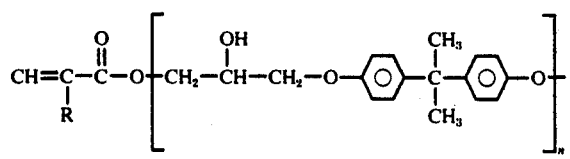

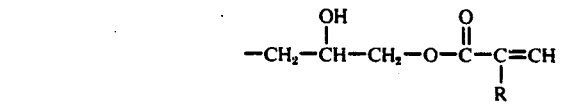

wherein $n$ is a number from 1 to 20 and each R group is hydrogen or an alkyl radical having 1 to 10 carbon atoms. Preferably $n$ is a number from 1 to 10 and each R group is hydrogen or an alkyl radical having 1 to 5 carbon atoms. U.S. Pat. No. 3,373,075 issued on Mar. 12, 1968, further describes these resins and methods for preparing them.

Vinyl ester chemistry is a new page in the chemical textbooks. This chemistry has produced a resin with chemical resistance and physical properties superior to polyesters. In polyesters and vinyl esters, failure generally occurs in the ester linkage which is normally hydrolyzed. The recurring ester groups in conventional polyesters generally appears in the main body of the chain and once attacked split the chain in half leaving it susceptible to additional chemical attack. Conversely note that the vinyl ester has only two ester linkages, both terminally located with reactive vinyl sites. Not only are there fewer ester groups to attack, but if they are attacked, they are terminally located and the main body of the molecule remains unaffected.

If desired, the coating comprises, in addition to the vinyl ester, materials such as styrene-butadiene rubber, calcium carbonate, or the like.

Present technology allows for the production of glass fibers having a diameter ranging from 0.0001 to 0.0004 inch at a rate of 10,000 to 15,000 feet per minute. Glass fibers are produced from small streams of molten glass which exude through tiny orifices located in what is called a bushing. Typically, bushings have 204 such orifices. The tiny streams of molten glass which issued from the bushings are attenuated by pulling the fibers until the diameters given above result and during which time the streams cool and rigidify into what are called filaments.

The filaments then are coated with the coatings of this invention and brought together to form a strand and coiled upon a spool to form a package. In another embodiment, the coated glass fibers can be routed directly to a chopping apparatus, thereby eliminating the collection package. The chopped strands can be dried prior to or subsequent to chopping. When the strands are gathered onto a collection package, the package is dried prior to positioning the package on a creel with numerous other packages. In another embodiment, the coating can be applied to the glass fibers after the strands or roving are formed rather than applying the coating to the filaments.

In the past, asbestos fibers have been very successful as a reinforcement for many types of inorganic matrices because of the characteristics and ability of the asbestos fibers to disperse and to provide some entangled network. The entangled network is generally thought to be due to the non-uniformity of the length of the asbestos fibers, ranging anywhere from ¼ inch to 4 inches in length. In order to employ glass fibers as a suitable replacement for asbestos fibers, it is generally thought that some of the characteristics possessed by the asbestos fibers should be obtained with glass fibers. For this reason the length of the glass fibers may range from ⅛ inch to about 2 inches in length and preferably from ½ inch to 1 inch in length in order to obtain some entanglement of the glass fibers upon dispersion of the glass fibers in the inorganic matrix. Furthermore, many inorganic matrices are susceptible to crack propagation. By the use of these longer fibers, the fibers traverse the cracks thereby adding strength to the matrix. Blends of various lengths of glass fibers also can be employed.

The coatings on the surfaces of the glass fibers are thin and generally range from 2 to 50% by weight of glass fibers. When the glass fibers are coated during forming the weight of coating preferably ranges from 2 to 7%. When the coatings are added at a later time, the weight of coating preferably ranges from 20 to 50%.

If desired, other sizings, silane, lubricants, and the like also can be applied to the glass fibers.

The advantages of this invention are illustrated by the following examples. The reactants, proportions, and other specific conditions are presented as being typical and should not be construed to limit the invention unduly.

EXAMPLE I

The following glass composition was employed to demonstrate the principles of this invention.

| Ingredients | Weight Percent | Mole Percent |
|---|---|---|
| $SiO_2$ | 61.1 | 66.6 |
| CaO | 5.1 | 6.0 |
| $Na_2O$ | 14.4 | 15.2 |
| $K_2O$ | 2.6 | 1.8 |
| $ZrO_2$ | 10.4 | 5.5 |
| $TiO_2$ | 6.0 | 4.9 |
| $Al_2O_3$ | 0.3 | — |
| $Fe_2O_3$ | 0.2 | — |

Liquidus temperature: No devitrification was found after 64 hours over a temperature range of 1500° to 2500° F.

| Viscosity | |
|---|---|
| Log Poise | Temperature, ° F |
| 1.75 | 2735 |
| 2.00 | 2590 |
| 2.25 | 2467 |
| 2.50 | 2362 |
| 2.75 | 2273 |
| 3.00 | 2188 |

The viscosity determinations in Example I were obtained using the apparatus and procedure described in U.S. Pat. No. 3,056,283 and in an article in *The Journal of the American Ceramic Society*, Vol. 42, No. 11, November, 1959, pages 537–541. The article is entitled "Improved Apparatus for Rapid Measurement of Viscosity of Glass at High Temperatures" by Ralph L. Tiede. Other specific viscosity determinations referred to herein also would be measured by the apparatus and procedure in the Tiede article.

The glass composition was fiberized and coated with the coatings of this invention or conventional forming sizes. Fiber diameter was maintained in the range of 50 to 55 hundred thousandths of an inch. All strands had 204 filaments.

The coating of this invention that I employed contained a vinyl ester resin represented by the formula:

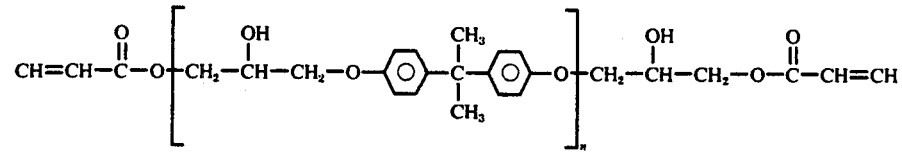

wherein $n$ ranges from 1 to 2.

The glass fibers were coated in a dip bath, stripped dried, and brought together to form a strand. The strands were cured in an oven at 450° F for about 2 minutes and then chopped into strands or wound on a collection package.

EXAMPLE II

A number of cement bars were prepared and tested for impact resistance under the method described below. The cement bars were reinforced with the glass fibers of Example I coated with the following coatings and autoclaved for various lengths of time at a pressure of 5 psi and a temperature of 230° F. The data is given in the following table. Strand size was 75 yards per pound. The glass employed was alkali resistant.

TABLE

IMPACT RESISTANCE OF AUTOCLAVED REINFORCED CEMENT
(Expressed in Pounds/in.$^2$ ± 95% Confidence Limits)

| coating on the glass fiber | vinyl ester resin | vinyl ester resin diluted with styrene | standard size control |
|---|---|---|---|
| Coating, wt. % based on the weight of glass fiber | 37 | 24 | Standard 1%** |
| Time in autoclave hours | | | |
| 4 | 2.7 | 3.4 | —* |
| 8 | 2.6 | 3.4 | 1.1 |
| 16 | 2.4 | 2.6 | 1.3 |
| 32 | 2.8 | 2.0 | 1.1 |
| 64 | —* | —* | 1.3 |
| 128 | —* | —* | 1.1 |

*not measured, not enough sample
**the glass fiber cannot pick up more size

The pendulum method for impact resistance was employed to obtain the above data.

In the pendulum method for impact resistance, a block of insulation, nominally 0.5 by 6 by 6 inches, is struck broadside by a pendulum having a known kinetic energy. The extent of the pendulum swing after breaking the sample, as given by the scale on the front of the tester, indicates the remaining energy. Using a conversion table, the scale reading is converted directly into the energy, in foot pounds, required to break the specimen. This energy is the impact resistance expressed in pounds/in.

The data of Example II reveals the advantage of employing the vinyl ester resin coated glass fibers of this invention in a cement matrix. The coated glass fibers of this invention provide excellent impact strength to cementitious materials reinforced with these vinyl ester resin coated glass fibers.

While the invention has been described in considerable detail, I do not wish to be limited to the particular embodiments shown and described; and it is my intention to cover hereby all novel adaptions, modifications, and arrangements thereof which come within the practice of those skilled in the art to which the invention relates.

I claim:

1. A cementitious product comprising a composite of reinforcing materials and a cementitious matrix wherein one of the reinforcing materials comprises glass fibers having a thin coating on the surfaces of the fibers wherein the coating consists essentially of a vinyl ester represented by the formula:

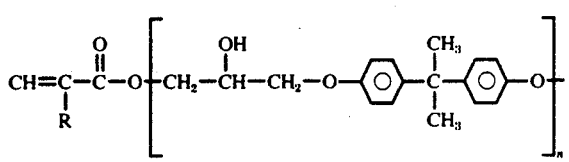

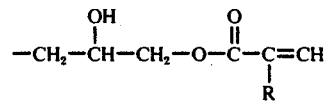

wherein $n$ is a number from 1 to 20 and each R group is hydrogen or an alkyl radical having 1 to 10 carbon atoms.

2. The cementitious product of claim 1 wherein $n$ is a number from 1 to 10 and each R group is hydrogen or an alkyl radical having 1 to 5 carbon atoms.

3. The cementitious product of claim 1 wherein the vinyl ester is represented by the formula:

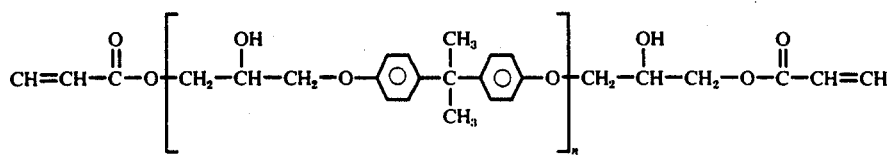

wherein $n$ ranges from 1 to 2.

4. The cementitious product of claim 1 wherein the coating of the surfaces of the glass fibers range from 2 to 50% by weight of glass fibers.

5. The cementitious product of claim 1 wherein said cementitious matrix is Portland cement.

6. The cementitious product of claim 1 wherein said cementitious matrix is hydrous calcium silicate.

7. The cementitious product of claim 1 wherein said cementitious matrix is concrete.

8. The cementitious product of claim 1 wherein said cementitious matrix is cement.

9. The cementitious product of claim 1 wherein said cementitious matrix is mortar.

* * * * *